United States Patent [19]
Ganmukhi

[11] Patent Number: 5,289,156
[45] Date of Patent: Feb. 22, 1994

[54] DATA COUPLING ARRANGEMENT

[75] Inventor: Mahesh N. Ganmukhi, Littleton, Mass.

[73] Assignee: Thinking Machines Corporation, Cambridge, Mass.

[21] Appl. No.: 77,897

[22] Filed: Jun. 16, 1993

Related U.S. Application Data

[63] Continuation of Ser. No. 783,044, Oct. 28, 1991, abandoned.

[51] Int. Cl.[5] ............................................. G06F 7/02
[52] U.S. Cl. .................................................. 340/146.2
[58] Field of Search ................. 340/146.2; 364/715.11

[56] References Cited
U.S. PATENT DOCUMENTS
5,073,864 12/1991 Methvin et al. ............... 364/715.11

Primary Examiner—Tan V. Mai
Attorney, Agent, or Firm—Richard A. Jordan

[57] ABSTRACT

A data coupling arrangement for successively receiving, in parallel, nibbles of respective data words, each nibble having a value, and for selectively coupling nibbles associated with one word in response to the relative values of the words. The selective coupling is determined by an identifier indication. The identifier indication is generated in response to a selected relationship between values represented by the nibbles from the respective words, until after nibbles are received whose values differ. At that point, the identifier indication is maintained in its condition thereby enabling the transfer of nibbles subsequently received from the same data word.

10 Claims, 2 Drawing Sheets

DATA COUPLING ARRANGEMENT

This is a continuation of co-pending application Ser. No. 07/783,044 filed on Oct. 28, 1991 now abandoned.

FIELD OF THE INVENTION

The invention relates generally to the field of digital electronic circuits and more particularly to circuits for selectively coupling, or transmitting, data words received from a source for further processing. The invention provides an arrangement for iteratively comparing binary-encoded values of sequentially-received elements of a multiple element word, determining which word has the larger value and transmitting the word with the larger value.

BACKGROUND OF THE INVENTION

It is often necessary in digital systems to compare the binary-encoded values of digital data words, determine which has the larger value and transmit the word having the larger or smaller value for further processing. A comparison may be performed by subtracting the two words and determining whether a positive or negative remainder is left. If a positive remainder is left, the word comprising the minuend in the subtraction operation is larger, but if a negative remainder is left the subtrahend has the larger value. Whether the minuend or the subtrahend is to be transmitted depends on whether the word with the larger or smaller value is to be further processed and the result of the subtraction operation. If a zero-valued remainder is left after the subtraction, both words have the same value and so either word could be transmitted for processing.

SUMMARY OF THE INVENTION

The invention provides a new and improved data coupling arrangement for selectively coupling, or transmitting, data words received from a source for further processing, the selection being made in response to the relative values of the words being received.

In brief summary, in one aspect the invention provides a data coupling arrangement that comprises a plurality of data input circuits for, in parallel, each successively receiving nibbles of respective data words, each nibble having a value, and a selective coupling circuit for selectively coupling nibbles from one of said data input circuits as identified by an input circuit identifier to an output. An input identifier control circuit generates the input circuit identifier having a selected condition to control said selective coupling circuit in response to a selected relationship between values represented by said nibbles to thereby control transfer of nibbles from said data input circuits to the output. A control circuit, in response to receipt by said data input circuits of nibbles whose values differ, enables said input identifier circuit to thereafter maintain its condition, thereby enabling said selective coupling circuit to thereafter transfer the nibbles subsequently received by same data input circuit to the output.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
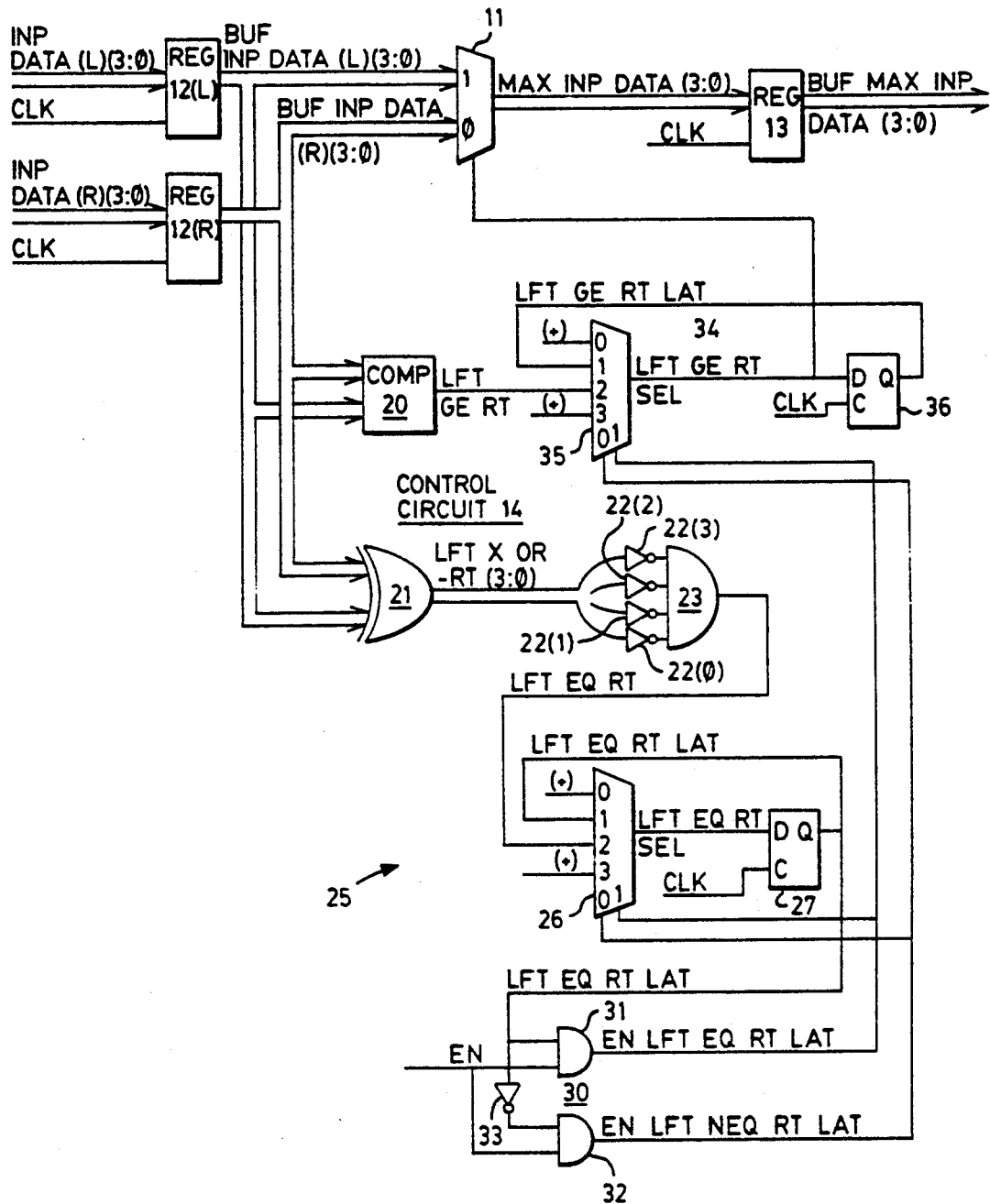
FIG. 1 is a logic diagram of a system constructed in accordance with the invention, including a novel comparator circuit.

FIG. 1 is a logic diagram of a data coupling arrangement 10 for receiving a pair of digital data words, comparing their binary-encoded values, and transmitting a digital data word having a binary-encoded value corresponding to that of the received word whose value was the larger. More specifically, the arrangement 10 iteratively receives, in parallel and starting with the most significant digits, sequential elements of the two words, determines which if either has a larger binary-encoded value or if their binary-encoded values are the same. While the arrangement 10 determines that the binary-encoded values of the received elements are the same, it transmits elements whose binary-encoded value corresponds to that of the received element. If, however, the arrangement 10 determines that the binary-encoded values of the received elements differ, the arrangement 10 identifies the word with the larger binary-encoded value and thereafter transmits elements of that word. In one particular embodiment, which will be described herein, the sequentially-received elements are all four-bit nibbles, with a word comprising a selected number of such nibbles. A thirty-two bit word will, for example, comprise eight sequentially-received nibbles. For each word, the nibbles coupled to the data coupling arrangement 10 are coupled in order from the most significant to the least significant nibbles of the word.

With reference to FIG. 1, the arrangement 10 includes a selector 11 for selectively coupling contemporaneously nibbles from one of two input registers 12(L) or 12(R) ["L" and "R" representing arbitrarily selected index values "left" and "right"] to an output register 13 in response to an LFT GE RT LAT left greater than or equal to right latched signal from a control circuit 14. The control circuit 14 iteratively compares the contemporaneously received nibbles of digital words latched in the input registers 12(L) and 12(R) and, while they are equal, enables the selector 11 to couple signals from one input register 12(L) or 12(R) to the output register. It will be appreciated that, while the control circuit 14 determines that initial pairs of the nibbles contemporaneously received by the input registers 12(L) and 12(R) are equal, it could enable the selector 11 to couple signals from either input register 12(L) or 12(R) to the output register 13. If the control circuit determines that the binary-encoded value of the nibble in one register is greater than the binary-encoded value of the nibble in the other register, the control circuit 14 enables the selector 11 to couple that and subsequent nibbles in the word from the register storing the larger-valued nibble to the output register. Accordingly, the output register iteratively receives the sequential nibbles of the digital word having the larger binary-encoded value.

More specifically, input registers 12(L) and 12(R) latch, in response to a tick of a CLK clock signal, INP DATA (L) (3:0) left input data and INP DATA (R) (3:0) right input data signals, respectively. At successive ticks of the CLK clock signal, the INP DATA (L) (3:0) and INP DATA (R) (3:0) signals represent, respectively, successive four-bit nibbles of respective digital words. The INP DATA (L) (3:0) and INP DATA (R)

(3:0) signals are provided by a source (not shown) in order from the most significant digits to the least significant digits of the respective words. The INP DATA (L) (3:0) input data signals comprise four signals each of which represents one of the binary digits (bits) of a nibble to be loaded into the input register 12(L). The INP DATA (L) (x) signals ("x" comprising an index between zero and three) are ordered such that the bit represented by increasing values of the index "x" are of increasing numerical significance in the nibble. Similarly, the INP DATA (R) (3:0) input data signals comprise four signals each of which represents one of the binary digits (bits) of a nibble to be loaded into the input register 12(R). The INP DATA (R) (y) signals ("y" comprising an index between zero and three) are ordered such that the bit represented by increasing values of the index "y" are of increasing numerical significance in the nibble.

The registers couple the latched signals as BUF INP DATA (L) (3:0) left buffered input data and BUF INP DATA (R) (3:0) right buffered input data signals, respectively, to input terminals of selector 11. The selector 11 comprises a multiplexer, which selectively couples one of the BUF INP DATA (L) (3:0) signals, or the BUF INP DATA (R) (3:0) signals, to its output terminals as MAX INP DATA (3:0) maximum input data signals, in response to a LFT GE RT SEL left greater than or equal to right selected signal from the control circuit 14. The control circuit 14 normally asserts the LFT GE RT LAT signal, in which case the selector 11 couples the BUF INP DATA (L) (3:0) left buffered input data signals as the MAX INP DATA (3:0) maximum input data signals to the output register 13. However, when the LFT GE RT LAT signal is negated, the selector 11 couples the BUF INP DATA (R) (3:0) signals as the MAX INP DATA (3:0) signals to the output register 13.

Figure 2:
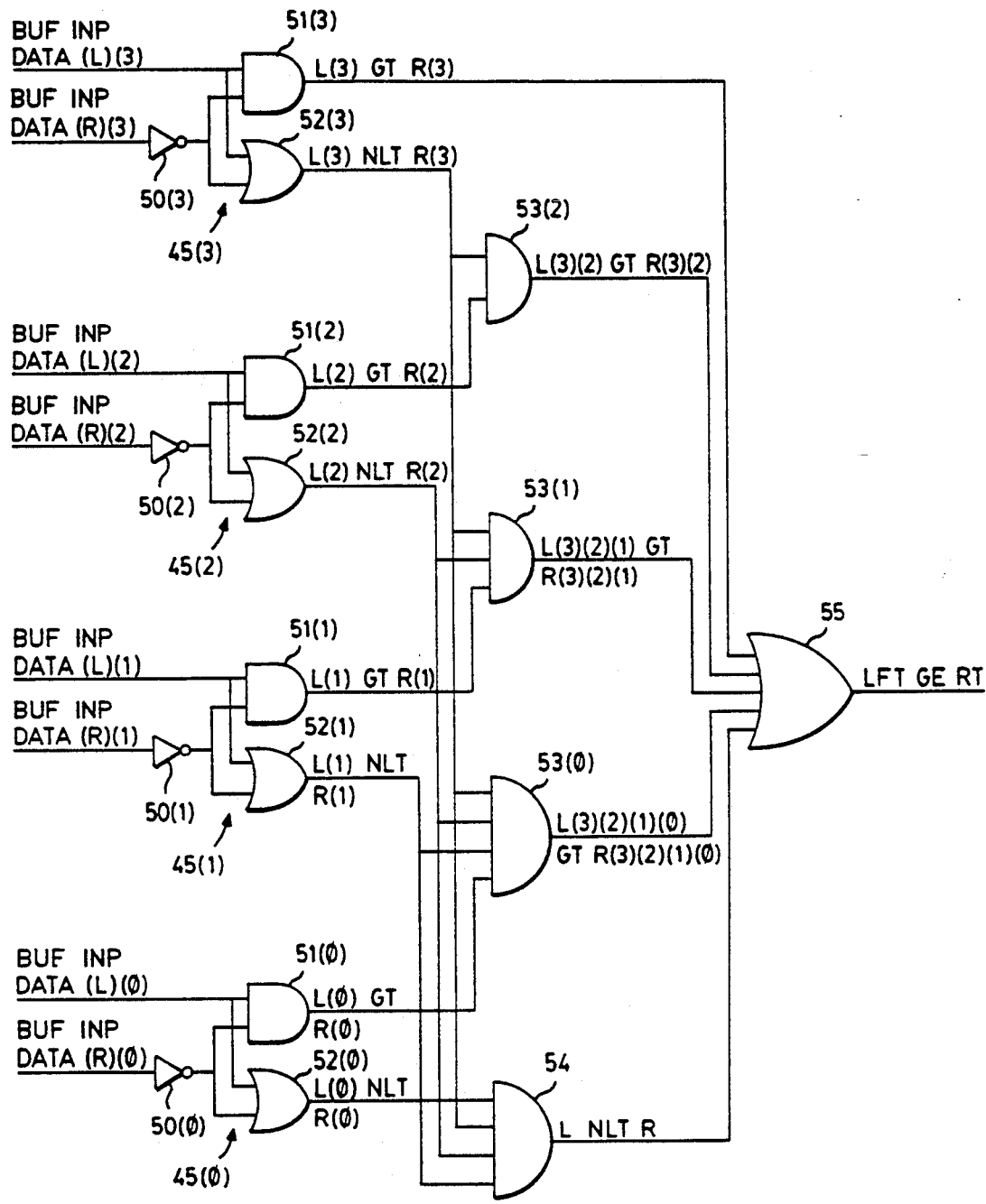
FIG. 2 is a detailed logic diagram of the comparator circuit depicted in FIG. 1.

The BUF INP DATA (L) (3:0) left buffered input data signals and the BUF INP DATA (R) (3:0) right buffered input data signals from registers 12(L) and 12(R) are also coupled to the control circuit 14, in particular to a comparator 20 and an exclusive-OR gate 21. The comparator 20, which will be described in detail below in connection with FIG. 2, compares the binary-encoded values represented by the BUF INP DATA (L) (3:0) left buffered input data signals and the BUF INP DATA (R) (3:0) right buffered input data signals and generates an LFT GE RT left greater than or equal to right signal in response. If the binary-encoded value of the BUF INP DATA (L) (3:0) left buffered input data signals is greater than or equal to the binary-encoded value of the BUF INP DATA (R) (3:0) right buffered input data signals, the comparator 20 asserts the LFT GE RT signal. On the other hand, if the binary-encoded value of the BUF INP DATA (L) (3:0) left buffered input data signals is less than the binary-encoded value of the BUF INP DATA (R) (3:0) right buffered input data signals, the comparator 20 negates the LFT GE RT signal.

The exclusive-OR gate 21 performs a bit-wise exclusive-OR operation in connection with the correspondingly-ordered bits of the BUF INP DATA (L) (3:0) left buffered input data signals representing the nibble stored in register 12(L) and the BUF INP DATA (R) (3:0) right buffered input data signals representing the nibble stored in register 12(R), and generates in response LFT XOR RT (3:0) left exclusive-OR right signals. That is, the exclusive-OR gate 21, for each index "i", generates a signal corresponding to the exclusive-OR of the BUF INP DATA (L) (i) "i-th" left buffered input data signal and the BUF INP DATA (R) (i) "i-th" right buffered input data signal, as the LFT XOR RT (i) "i-th" left exclusive-OR right signal. Accordingly, if, for an index "i," the BUF INP DATA (L) (i) and BUF INP DATA (R) (i) signals are both asserted or both negated, the LFT XOR RT (i) signal will be negated. On the other hand, if one of the BUF INP DATA (L) (i) and BUF INP DATA (R) (i) is asserted and the other negated, the LFT XOR RT (i) signal will be asserted. Accordingly, if corresponding digits of the nibbles stored in registers 12(L) and 12(R), which govern the asserted and negated conditions of the BUF INP DATA (L) (i) and BUF INP DATA (R) (i) signals, respectively, have the same values, the correspondingly-indexed LFT XOR RT (i) left exclusive-OR right signal will be negated. On the other hand, if corresponding digits of the nibbles stored in registers 12(L) and 12(R) have different values, the correspondingly-indexed LFT XOR RT (i) left exclusive-OR right signal will be asserted.

The individual LFT XOR RT (i) left exclusive OR right signals from exclusive-OR gate 21 are complemented in inverters 22(i), whose output signals are coupled to the input terminals of an AND gate 23 which generates an LFT EQ RT left equals right signal in response. If corresponding digits of the nibbles stored in the registers 12(L) and 12(R) have the different values, the one of the correspondingly-indexed BUF INP DATA (L) (i) or BUF INP DATA (R) (i) buffered input signals will be asserted and the other negated, with the result that the correspondingly-indexed LFT XOR RT (i) left exclusive-OR right signal will be asserted. The correspondingly-indexed inverter 22(i) will accordingly generate a negated output signal which will disable the AND gate 23, causing it to negate the LFT EQ RT left equals right signal. On the other hand, if corresponding digits of the nibbles stored in the registers 12(L) and 12(R) have the same values, the correspondingly-indexed BUF INP DATA (L) (i) and BUF INP DATA (R) (i) buffered input signals will be both asserted or negated, with the result that the correspondingly-indexed LFT XOR RT (i) left exclusive-OR right signals will be negated. The correspondingly-indexed inverter 22(i) will accordingly generate an asserted output signal. If all inverters 22(i) are generating asserted output signals, which will occur if each set of correspondingly-indexed BUF INP DATA (L) (i) and BUF INP DATA (R) (i) signals have the same asserted or negated condition, all of the inverters 22(i) will be generating asserted output signals, which will enable the AND gate 23, causing it to assert the LFT EQ RT left equals right signal.

The LFT EQ RT left equals right signal from AND gate 23 is coupled to a latch circuit 25. Latch circuit 25 iteratively latches the condition of the LFT EQ RT signal for each successive pair of nibbles represented by the BUF INP DATA (L) (3:0) and BUF INP DATA (R) (3:0) signals whose binary-encoded values are equal, that is, while the LFT EQ RT left equals right signal is asserted. If at some point the LFT EQ RT signal is negated binary-encoded values of the nibbles represented by the BUF INP DATA (L) (3:0) and BUF INP DATA (R) (3:0) signals are not equal, the latch circuit 25 thereafter latches and maintains the negated condition until after the last nibble of the words are received.

To accomplish these operations, the latch circuit 25 includes a multiplexer 26, a flip-flop 27 and an enabling circuit 30. Prior to receiving INP DATA (L) (3:0) and INP DATA (R) (3.0) signals representing the first nibbles of the respective words, an EN enabling signal is negated, which disables two AND gates 31 and 32 in enabling circuit 30. The disabled AND gates 31 and 32 negate both an EN LFT EQ RT LAT enabled latched left equals right signal and an EN LFT NEQ RT LAT enabled latched left not equal to right signal, respectively, which, in turn, enable the multiplexer 26 to couple an asserted signal from an input terminal to its output terminal as an asserted LFT EQ RT SEL selected left equals right signal. The flip-flop 27 latches the asserted LFT EQ RT SEL signal at the next tick of the CLK clock signal, and asserts in response an LFT EQ RT LAT latched left equals right signal.

The EN LFT EQ RT LAT enabled latched left equals right signal and EN LFT NEQ RT LAT enabled latched left not equal to right signal from AND gates 31 and 32 also control a latch circuit 34. In particular, the negated EN LFT EQ RT LAT and EN LFT NEQ RT LAT signals both enable a multiplexer 35 to couple an asserted signal to its output terminal as a LFT GE RT SEL selected left greater than or equal to right signal. The asserted LFT GE RT SEL signal is coupled to the multiplexer 11, at this point enabling it to couple the BUF INP DATA (L) (3:0) buffered input data signals from register 12(L) to its output terminals as the MAX INP DATA (3:0) maximum input data signals. A flip-flop 36 latches the asserted LFT GE RT signal at the next tick of the clock signal. It will be appreciated that these operations occur contemporaneous with the occurrence of the above-described operations by latch circuit 25, so that the flip-flop 36 will latch the asserted LFT GE RT SEL signal from multiplexer 35 at the same tick of the CLK signal that the flip-flop 27 latches the LFT EQ RT SEL signal from multiplexer 26. After latching the asserted LFT GE RT SEL signal, the flip-flop 36 asserts a LFT GE RT LAT signal.

When INP DATA (L) (3:0) and INP DATA (R) (3:0) signals representing the first nibbles of the respective words are latched in registers 12(L) and 12(R), the registers couple the BUF INP DATA (L) (3:0) and BUF INP DATA (R) (3:0) buffered input data signals, respectively, to the multiplexer 11 and comparator 20. If the comparator determines whether the binary-encoded value of the BUF INP DATA (L) (3:0) buffered input data signals is greater than or equal to the binary-encoded value of the BUF INP DATA (R) (3:0) signals. If so, the comparator 20 maintains the LFT GE RT left greater than or equal to right signal in an asserted condition. However, if the comparator 20 determines that the binary-encoded value of the BUF INP DATA (L) (3:0) buffered input data signals is less than the binary-encoded value of the BUF INP DATA (R) (3:0) signals, it negates the LFT GE RT signal.

Returning to latch circuit 25, the asserted LFT EQ RT LAT latched left equals right signal from flip-flop 27 is coupled to one input terminal of the AND gate 31. An inverter 33 also complements the LFT EQ RT LAT signal, and the complemented signal is coupled to one input terminal of AND gate 32. When INP DATA (L) (3:0) and INP DATA (R) (3:0) signals representing the first nibbles of the respective words are latched in registers 12(L) and 12(R), the EN enabling signal is asserted. The asserted EN and LFT EQ RT LAT signals energize AND gate 31 enabling it to assert the EN LFT EQ RT LAT enabled latched left equals right signal. The negated signal from inverter 33 maintains the AND gate 32 deenergized, thereby maintaining the EN LFT NEQ RT LAT enabled latched left not equal to right signal in the negated condition. With the EN LFT EQ RT LAT and EN LFT NEQ RT LAT signals in these conditions, multiplexer 35 is enabled to couple the LFT GE RT left greater than or equal to right signal to its output terminal as the LFT GE RT SEL selected left greater than or equal to signal.

If the comparator 20 is asserting the LFT GE RT signal, indicating that the binary-encoded value of the BUF INP DATA (L) (3:0) signals is greater than or equal to the binary-encoded value of the BUF INP DATA (R) (3:0) signals, the LFT GE RT SEL signal is also asserted, which enables the multiplexer 11 to continue coupling the BUF INP DATA (L) (3:0) signals from the left input register 12(L) as the MAX INP DATA (3:0) maximum input data signals. On the other hand, if the comparator 20 is negating the LFT GE RT signal, indicating that the binary-encoded value of the BUF INP DATA (L) (3:0) signals is less than the binary-encoded value of the BUF INP DATA (R) (3:0) signals, the LFT GE RT SEL signal is also negated, which enables the multiplexer 11 to couple the BUF INP DATA (R) (3:0) signals from the right input register 12(R) as the MAX INP DATA (3:0) maximum input data signals.

Contemporaneously, the AND gate 23 generates the LFT EQ RT left equals right signal whose condition indicates whether the binary-encoded value of the BUF INP DATA (L) (3:0) signals equal the binary-encoded value of the BUF INP DATA (R) (3:0) signals. Since at this point the AND gate 31 is asserting the EN LFT EQ RT LAT enabled latched left equals right signal, and negating the EN LFT NEQ RT LAT enabled latched left not equal to right signal, the multiplexer 26 couples the LFT EQ RT signal to its output terminal as the LFT EQ RT SEL selected left equals right signal.

At the next tick of the CLK signal, the output register 13 latches the MAX INP DATA (3:0) signals, which correspond to the one of the BUF INP DATA (L) (3:0) or the BUF INP DATA (R) (3:0) registered input data signals which representing the maximum binary-encoded value. In addition, if there are additional nibbles in the respective words, the registers 12(L) and 12(R) latch INP DATA (L) (3:0) and INP DATA (R) (3:0) input data signals representing the nibbles.

Contemporaneously, the flip-flop 27 latches the LFT EQ RT SEL selected left equals right signal, and generates the LFT EQ RT LAT latched left equals right signal in response thereto. In addition, flip-flop 36 latches the LFT GE RT SEL selected left greater than or equal to right signal, and generates a LFT GE RT LAT latched greater than or equal to right signal in response. It will be appreciated that the condition of the LFT EQ RT LAT signal will reflect the condition of the LFT EQ RT signal generated by AND gate 23 in response to the BUF INP DATA (L) (3:0) and BUF INP DATA (R) (3:0) signals representing the first nibbles of the respective data words. Similarly, the condition of the LFT GE RT LAT signal will reflect the condition of the LFT GE RT signal generated by comparator 20 in response to the same BUF INP DATA (L) (3:0) and BUF INP DATA (R) (3:0) signals.

If AND gate 23 was generating an asserted LFT EQ RT signal in response to the BUF INP DATA (L) (3:0) and BUF INP DATA (R) (3:0) signals representing the first nibbles of the respective data words, indicating that the nibbles had the same binary-encoded values, the flip-flop 27 will be generating an asserted LFT EQ RT LAT left equals right latched signal when the BUF INP DATA (L) (3:0) and BUF INP DATA (R) (3:0) signals represent the second nibbles of the respective data words. As a result, AND gates 31 and 32 would be generating respective EN LFT EQ RT LAT enabled latched left equals right and EN LFT NEQ RT LAT enabled latched left not equal to right signals having the same respective asserted and negated conditions. Accordingly, multiplexer 26 is enabled to continue coupling the LFT EQ RT left equals right signal from AND gate 23 to its output terminal as the LFT EQ RT SEL selected left equal to right signal, and multiplexer 35 is enabled to continue coupling the LFT GE RT left greater than or equal to right signal from the comparator 20 to its output terminal as the LFT GE RT SEL selected left greater than or equal to right signal.

At this point, if the comparator 20 determines that the binary-encoded value of the BUF INP DATA (L) (3:0) buffered input data signals is equal to or greater than the binary-encoded value of the BUF INP DATA (R) (3:0) signals, the comparator 20 asserts the LFT GE RT signal, which enables the multiplexer 35 to assert the LFT GE RT SEL signal, in turn enabling the multiplexer 11 to couple the BUF INP DATA (L) (3:0) buffered input data signals as the MAX INP DATA (3:0) signals. On the other hand, if the comparator 20 determines that the binary-encoded value of the BUF INP DATA (L) (3:0) buffered input data signals is less than the binary-encoded value of the BUF INP DATA (R) (3:0) signals, the comparator 20 negated the LFT GE RT signal, which enables the multiplexer 35 to negate the LFT GE RT SEL signal, in turn enabling the multiplexer 11 to couple the BUF INP DATA (R) (3:0) buffered input data signals as the MAX INP DATA (3:0) signals.

These operations will be performed for each of the successively-registered nibbles of the respective data words until registers 12(L) and 12(R) latch nibbles whose binary-encoded values differ. When the registers 12(L) and 12(R) latch nibbles whose binary-encoded values differ, which may be the first nibbles of the respective words, the comparator 20 will assert or negate the LFT GE RT left greater than or equal to right signal, to identify which register 12(L) or 12(R) has the nibble with the larger binary-encoded value. The EN LFT EQ RT LAT enabled latched left equals right and EN LFT NEQ RT LAT enabled latched left not equal to right signal from AND gates 31 and 32, respectively, are, as described above, conditioned to enable multiplexer 35 to couple the LFT GE RT left greater than or equal to right signal to its output terminal as the LFT GE RT SEL selected left greater than or equal to right signal. The LFT GE RT SEL signal enables the multiplexer 11 to, as described above, couple the one of the BUF INP DATA (L) (3:0) and BUF INP DATA (R) (3:0) signals having the larger binary-encoded value to its output as the MAX INP DATA (3:0) maximum input data signals.

Contemporaneously, the AND gate 23 will negate the LFT EQ RT left equals right signal. The EN LFT EQ RT LAT enabled latched left equals right and EN LFT NEQ RT LAT enabled latched left not equal to right signal from AND gates 31 and 32, respectively, are, as described above, conditioned to enable multiplexer 26 to couple the negated LFT EQ RT signal to its output terminal as the LFT EQ RT SEL selected left equals right signal. At the next tick of the CLK signal the output register 13 will latch the MAX INP DATA (3:0) maximum input data signals, which correspond to the one of the INP DATA (L) (3:0) or INP DATA (R) (3:0) input data signals latched by the registers 12(L) and 12(R) at the last tick of the CLK signal whose binary-encoded value was the larger. In addition, the same tick of the CLK signal will enable the flip-flop 27 to latch the LFT EQ RT SEL signal, flip-flop 36 to latch the LFT GE RT SEL signal, and registers 12(L) and 12(R) to latch the INP DATA (L) (3:0) or INP DATA (R) (3:0) input data signals, which represent the next nibble of the respective data words.

Since, at this point, the LFT EQ RT LAT latched left equals right signal from flip-flop 27 is negated, the AND gate 31 will be de-energized, negating the EN LFT EQ RT LAT enabled latched left equals right signal. The negated LFT EQ RT LAT signal will be complemented by inverter 33, thereby energizing AND gate 32 to assert the EN LFT NEQ RT LAT enabled latched left not equal to right signal. With the AND gates 31 and 32 generating EN LFT EQ RT LAT and EN LFT NEQ RT LAT signals with these conditions, the multiplexer 26 is enabled to couple the LFT EQ RT LAT signal from the output terminal of flip-flop 27 to its output terminal as the LFT EQ RT SEL signal. Similarly, the multiplexer 35 is enabled to couple the LFT GE RT LAT signal from the output terminal of flip-flop 36 to its output terminal as the LFT GE RT SEL signal. Thus, the LFT EQ RT SEL signal from multiplexer 26 will remain negated, and the LFT GE RT SEL signal from multiplexer 35 will maintain the asserted or negated condition that it had immediately prior to the last tick of the CLK signal. It will be appreciated that the negated condition of the EN LFT EQ RT LAT signal and the asserted condition of the EN LFT NEQ RT LAT signal, initially resulting from the negation of the LFT EQ RT signal by AND gate 23 at one tick of the CLK signal, will effectively enable the multiplexer 26 to isolate the LFT EQ RT SEL signal from the LFT EQ RT signal at later ticks of the CLK signal. Accordingly, once the LFT EQ RT LAT signal is negated, it will remain negated, at least until the EN enable signal is negated as described above to disable both AND gates 31 and 32.

Similarly, the negated condition of the EN LFT EQ RT LAT signal and the asserted condition of the EN LFT NEQ RT LAT signal will enable the multiplexer 35 to thereafter isolate the LFT GE RT SEL left greater than or equal to right signal from the LFT GE RT signal provided by comparator 20. The LFT GE RT SEL signal will reflect the condition of the LFT GE RT signal at the point at which the AND gate 23 negated the LFT EQ RT left equals right signal, that is, at the point at which the binary-encoded values of the nibbles represented by the BUF INP DATA (L) (3:0) and BUF INP DATA (R) (3:0 ) buffered input data signals differed. The EN LFT EQ RT LAT signal and EN LFT NEQ RT LAT signal enable the multiplexer 35 and flip-flop 36 to, in turn, enable the multiplexer 11 to continue coupling the one of the BUFF INP DATA (L) (3:0) signals or the BUF INP DATA (R) (3:0) signals from the same register 12(L) or 12(R) which comparator 20 identified as having the nibble with the larger binary-encoded value.

Thus, when the AND gate 23 determines that the binary-encoded values of the BUF INP DATA (L)

(3:0) signals and the BUF INP DATA (R) (3:0) signals differ, the multiplexer 11 is then and thereafter enabled to couple the BUF INP DATA (L) (3:0) or BUF INP DATA (R) (3:0) signals from the register 12(L) or 12(R) which was initially determined to have the larger binary-encoded value, to the output register 13 as the MAX INP DATA (3:0) maximum input data signals. As a result, the series of MAX INP DATA (3:0) signals coupled to the register 13 at the succesive ticks of the CLK signal, and thus the series of BUF MAX INP DATA (3:0) transmitted by the register 13 at the succesive ticks of the CLK signal, while the EN enable signal is asserted, represents a data word having a binary-encoded value corresponding to the data word represented by the INP DATA (L) (3:0) or INP DATA (R) (3:0) signals having the larger binary-encoded value.

After all nibbles representing the respective data words have been coupled to to the registers 12(L) and 12(R), the EN signal can be negated. At that point, the AND gates 31 and 32 will be de-energized, which negates the EN LFT EQ RT LAT enabled latched left equals right and EN LFT NEQ RT LAT enabled latched left not equal to right latched signals. As a result, the multiplexer 26 is enabled to couple the asserted signal to its output terminal as the asserted LFT EQ RT SEL selected left equals right signal, which is latched by the flip-flop 27 at the next tick of the CLK signal, causing the LFT EQ RT LAT signal to be asserted. The EN LFT EQ RT LAT and EN LFT NEQ RT LAT signals also enable multiplexer 35 to couple an asserted signal to its output terminal as the asserted LFT GE RT SEL selected left greater than or equal to right signal, which is latched by the flip-flop 37 at the same tick of the CLK signal. Since the LFT EQ RT LAT signal is asserted, the arrangement 10 is in condition to repeat the operations described above with respect to a new data word.

It will be appreciated that the arrangement 10 depicted in FIG. 1 may be adapted to couple the nibbles of the received data word which has the lower binary-encoded value, by interchanging the connections of the BUF INP DATA (L) (3:0) and BUF INP DATA (R) (3:0) registered input data signals to multiplexer 11, complementing the LFT GE RT signal from comparator 20, or complementing the LFT GE RT SEL signal provided to control multiplexer 11.

In addition, it will be appreciated that, although the arrangement 10 depicted in FIG. 1 has been described as receiving and using elements of the respective words comprising four-bit nibbles, the arrangement 10 may receive and use nibbles of any number of bits. It would be advantageous, however, if the number of bits received for each of the two contemporaneously-received nibbles be the same, and if the relative numerical significance of the respective bits be the same.

FIG. 2 depicts a detailed logic diagram for comparator 20. With reference to FIG. 2, the comparator 20 includes a plurality of input decoders 45(3) through 45(0) [generally identified by reference numeral 45(i)], each of which receives correspondingly-indexed one of each of the BUF INP DATA (L) (3:0) and BUF INP DATA (R) (3:0) buffered input data signals, and generates in response an L(i) GT R(i) left "i" greater than right "i" signal and an L(i) NLT R(i) left "i" not less than right "i" signal. In the following, increasing values of index "i" will be associated with bits of the respective nibbles of increasing numerical significance. Each input decoder 45(i) performs a bit-wise comparison of the correspondingly-indexed bits of the nibbles stored in the input registers 12(L) and 12(R), as represented by the asserted or negated conditions of the correspondingly-indexed BUF INP DATA (L) (i) and BUF INP DATA (R) (i) buffered input data signals. If the "i-th" bit in the input register 12(L) has a larger value than the correspondingly-indexed bit of the input register 12(R), which will be indicated by the BUF INP DATA (L)(i) signal being asserted while the BUF INP DATA (R) (i) signal is negated, the input decoder 45(i) asserts the L(i) GT R(i) signal. If the "i-th" bit in input register 12(L) has a value which is not less than the value of the "i-th" bit in input register 12(R), which will be indicated by the BUF INP DATA (L) (i) signal being asserted or the BUF INP DATA (R) (i) signal being negated, the input decoder asserts the L(i) NLT R(i) signal.

To accomplish these operations, each input decoder 45(i) receives the BUF INP DATA (L) (i) and BUF INP DATA (R) (i) registered input data signals from the respective input registers 12(L) and 12(R). Each input register 45(i) includes an inverter 50(i) which complements the BUF INP DATA (R) (i) signal. The BUF INP DATA (L) (i) signal and complemented BUF INP DATA (R) (i) signal are coupled to respective input terminals of an AND gate 51(i) and an OR gate 52(i). If the BUF INP DATA (L) (i) signal is asserted, it enables one input terminal of AND gate 52(i). If the correspondingly-indexed BUF INP DATA (R) (i) signal is negated, inverter 50(i) enables the other input terminal, thereby energizing the AND gate 51(i) to assert the L(i) GT R(i) signal. Since the BUF INP DATA (L) (i) signal will be asserted if the correspondingly-indexed bit in input register 12(L) has a binary value "one" and the BUF INP DATA (R) (i) signal will be asserted if the correspondingly-indexed bit in input register 12(R) has a binary value "zero," the L(i) GT R(i) signal will be asserted if the binary value of the bit in the input register 12(L) is larger than that of the bit in the input register 12(R). It will be appreciated that the AND gate will be de-energized, thereby negating the L(i) GT R(i) signal, if either the BUF INP DATA (L) (i) signal is negated or the BUF INP DATA (R) (i) signal is asserted, which will occur if the binary value of the bit in input register 12(R) is equal to or greater than that of the bit in input register 12(L).

The OR gate 52(i) also receives the BUF INP DATA (L) (i) signal from input register 12(L) and the complemented BUF INP DATA (R) (i) signal from inverter 12(R) and generates an L(i) NLT-R(i) left "i" not less than right "i" signal. The OR gate 52(i) asserts the L(i) NLT R (i) signal if either the BUF INP DATA (L) (i) signal is asserted or the BUF INP DATA (R) (i) signal is negated. Accordingly, the OR gate 52(i) negates the L(i) NLT R(i) signal only if the BUF INP DATA (R) (i) signal is asserted and the BUF INP DATA (L) (i) signal is negated, which will occur only if the binary value of the bit in the register 12(R) is greater than the binary bit in the register 12(L). Thus, the L(i) NLT R(i) signal will be asserted if the value of the binary bit in register 12(L) is not less than the value of the binary bit in the register 12(R).

It will be appreciated that, if the encoder 45(i) is asserting the L(i) GT R(i) signal is asserted, it will also be asserting the L(i) NLT R(i) signal for the same index "i". This follows from the fact that if the value of the binary bit in the register 12(L) is "greater than" the value of the bit in the register 12(R), which will be case if the L(i) GT R(i) signal is asserted, it follows that the value of the binary bit in the register 12(L) is "not less than" the value of the bit in the register 12(R), which will be reflected by the assertion of the L(i) NLT R(i) signal. However, if encoder 45(i) is asserting the L(i) NLT R(i) signal, it may not necessarily be asserting the L(i) GT R(i) signal, since if the value of the binary bit in the register 12(L) is "not less than" the value of the bit in the register 12(R), which will be reflected by the assertion of the L(i) NLT R(i) signal, the value of the binary bit in the register 12(L) need not be "greater than" the value of the bit in the register 12(R).

The L(i) GT R(i) left "i" greater than right "i" signals and L(i) NLT R(i) left "i" not less than right "i" signals from all of the decoders 45(i) are coupled to an encoder comprising AND gates 53(2) through 53(0) [generally identified by reference number 53(j)], an AND gate 54, and an OR gate 55. Each AND gates 53(j) receives the L(i) GT R(i) left "i" greater than right "i" signal from the decoder 45(i) for "i" equal to "j", and the L(i) NLT R(i) left "i" not less than right "i" signal(s) for "i" greater than "j", and generates in response an L(3) . . . (j) GT R(3) . . . (j) signal. If an AND gate 53(j) receives L(i) NLT R(i) signals ("i" greater than "j") all of which are asserted, the values of the bits of the nibble in the input register 12(L) of higher significance than bit "j" will be not less than the value of the corresponding bits of the nibble in input register 12(R). If, in addition, the L(i) GT R(i) signal for "i" equal to "j" signal is asserted, the bits of the nibble in input register 12(L) of significance greater than or equal to "j" will have a binary-encoded value greater than that of the corresponding bits of the nibble in input register 12(R), in which case AND gate 53(j) will be energized to assert the L(3) . . . (j) GT R(3) . . . (j) signal.

It will be appreciated that multiple ones of the AND gates 53(j) may be energized contemporaneously to assert their respective L(3) . . . (j) GT R(3) . . . (j) signals. Indeed, if an AND gate 53(j₁) is energized to assert an L(3) . . . (j₁) GT R(3) . . . (j₁) signal, AND gate 53(j₂), for all indices "j₂" less than index "j₁," will also be energized to assert their respective L(3) . . . (j₂) GT R(3) . . . (j₂) signals.

AND gate 54 receives the L(i) NLT R(i) left "i" not less than right "i" signals from all of the OR gates 52(i), and generates in response an L NLT R left not less than right signal. If all of the L(i) NLT R(i) signals are asserted, the AND gate will be energized to assert the L NLT R signal. It will be appreciated that this will occur if each of the bits of the nibble in the input register 12(L) has a value greater than that of the corresponding value of the bits of nibble in input register 12(R), or if they are all equal.

The OR gate 55 consolidates the L(3) GT R(3) left "3" greater than right "3" signal from the decoder 45(3) for the most-significant bits, the L(3) . . . (j) GT R(3) . . . (j) signals from the encoders 53(j) and the L NLT R left not less than right signal from AND gate 54, and generates the LFT GE RT left greater than or equal to right signal in response. It will be appreciated that OR gate 55 will be energized to assert the LFT GE RT signal in response to the assertion of any of the L(3) GT R(3) signal, the L(3) . . . (j) GT R(3) . . . (j) signal, or the L NLT R signal. Thus, the LFT GE RT signal will be asserted if the binary-encoded value of the nibble in the input register 12(L) is greater than or equal to the binary-encoded value of the nibble in the input register 12(R).

It will be appreciated that, if AND gate 54 is not provided, the comparator would provide an asserted output signal only if the binary-encoded value of the nibble in input register 12(L) is greater than the binary-encoded value of the nibble in input register 12(R). This follows from the facts that (1) AND gate 51(3) will be energized to assert the L(3) GT R(3) signal only if value of the most-significant bit in register 12(L) is greater than the value of the most significant bit in register 12(R), and (2) AND gate 53(i) will be energized to assert the L(3) . . . (j) GT R(3) . . . (j) signals only if the L(i) GT R(i) singal (index "i" equals index "j") is asserted, which will preclude assertion of any of the L(3) GT R(3) or L(3) . . . (j) GT R(3) . . . (j) signals if any of the correspondingly-indexed bits of the nibbles in input registers 12(L) and 12(R) are the same.

Comparator 20 depicted in FIG. 2 provides several advantages, including the fact that it provides comparison results relatively rapidly. In particular, the comparator 20 will condition the LFT GE RT signal in approximately three gate delays after the BUF INP DATA (L) (i) and BUF INP DATA (R) (i) buffered input data signals are applied to the inputs. The three gate delays are reflected in the three columns of components shown in FIG. 2. That is, a first gate delay corresponds to the delay provided by inverters 50(i) combined with the delays provided by the parallel-connected AND gates 51(i) and OR gates 52(i), a second gate delay corresponding to the delay provided by AND gates 53(j) and 54, and the third gate delay corresponds to the delay provided by OR gate 55. Thus, comparator 20 may find particular utility in connection with digital circuits, such as the circuit depicted in FIG. 1, in which rapid provision of comparison results can enhance their operation.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A data coupling arrangement comprising:
   A. a plurality of data input circuits for, in parallel, each successively receiving nibbles of respective data words, each nibble having a value;
   B. a selective coupling circuit for selectively coupling nibbles from one of said data input circuits as identified by an input circuit identifier to an output;
   C. an input identifier control circuit for generating the input circuit identifier having a selected condition to control said selective coupling circuit in response to a selected relationship between values represented by said nibbles to thereby control transfer of nibbles from said data input circuits to the output; and
   D. a latch control circuit for, in response to receipt by said data input circuits of nibbles whose values differ, enabling said input identifier circuit to thereafter maintain its condition, thereby enabling said selective coupling circuit to thereafter transfer the nibbles subsequently received by same data input circuit to the output.

2. A data coupling arrangement as defined in claim 1 in which said input identifier control circuit includes:

A. a comparator circuit for generating a nibble comparison signal indicating a relative value of nibbles contemporaneously received by said data input circuits; and B. a latch circuit connected to said comparator circuit and said latch control circuit for generating said input circuit identifier in response to said nibble comparison signal under control of said latch control circuit.

3. A data coupling arrangement as defined in claim 2 in which:

A. the latch control circuit generates a latch control signal (i) having an initial pass state when the initial nibbles of a data word contemporaneously received by the data input circuits have the same value, and (ii) switching to a latch state when said latch control circuit determines that the nibbles contemporaneously received by the data input circuits have differing values, the latch control circuit maintaining the latch control signal in the latch state through the last nibble comprising the date word, and B. said latch circuit generates said input circuit identifier:

(i) to correspond to the nibble comparison signal generated by the comparator circuit while the latch control signal is in the pass state, and (ii) to hold the nibble comparison signal generated by the comparator circuit when the latch control signal switches to the latch state, the latch circuit maintaining the nibble comparison signal while the latch control signal is in the latch state.

4. A data coupling arrangement as defined in claim 3 in which said latch circuit comprises:

A. a flip-flop circuit for receiving and latching the input circuit identifier, the flip-flop circuit generating an output signal corresponding to the latched input circuit identifier; and B. a multiplexer connected to said comparator, said flip-flop circuit, and said latch control circuit, the multiplexer coupling as the input circuit identifier:

(i) the signal from the comparator while the latch control signal is in the pass state, and (ii) the output signal from the flip-flop circuit while the latch control signal is in the latch state.

5. A data coupling arrangement as defined in claim 4 in which said multiplexer is further connected to couple an initialization signal to the flip-flop circuit when the latch control signal is in a disable state.

6. A data coupling arrangement as defined in claim 2 in which each nibble of each input data word comprises a predetermined number of data bits, the data bits of each nibble being organized in a series of bit positions representing a value ordering, the comparator circuit including:

A. a first stage comprising a series of input decoders each associated with a bit position for receiving the data bits in respective bit positions from the data input circuits, each input decoder asserting a "greater than" output signal if the data bit received from a predetermined one of said data input circuits has a value greater than the value of the data bit received from the other of said data input circuit, and asserting a "not less than" output signal if the data bit from the predetermined data input circuit has a value not less than the value of the data bit received from the other data input circuit;

B. a second stage comprising:

(i) a series of relative value resolution circuits each associated with a bit position other than the highest-ordered bit position, each relative value resolution circuit asserting a bit position order "greater than" signal if the "not less than" output signal from input decoders associated with higher-ordered bit positions is asserted and the "greater than" output signal from an input decoder associated with its bit position is also asserted; and (ii) a "not less than" value resolution circuit for generating a nibble "not less than" signal indicating that the "not less than" signals from all of the input decoders are asserted, and C. a third stage for generating the nibble comparison signal in response to the "greater than" output signal from the input decoder associated with the highest-order bit position, the bit position order "greater than" signals from all of the relative value resolution circuits and the nibble "not less than" signal from the "not less than" value resolution circuit.

7. A data coupling arrangement as defined in claim 1 in which each nibble of each data word includes a plurality of data bits, said latch control circuit comprising:

A. bit-wise comparison circuit for comparing asserting an equals signal if corresponding data bits of the data words received by the data input circuit have the same value; and B. a latch circuit for generating a latch control signal (i) corresponding to the equals signal from the bit-wise comparison signal when the equals signal initially indicates that the nibbles of a data word contemporaneously received by the data input circuits have the same value, and (ii) latching the equals signal from said bit-wise comparison circuit when the equals signal indicates that determines that the nibbles contemporaneously received by the data input circuits have differing values, the latch circuit maintaining the latch control signal through the last nibble comprising the date word.

8. A data coupling arrangement as defined in claim 7 in which said bit-wise comparison circuit includes:

A. an exclusive-OR gate circuit for receiving corresponding bits from said data input circuits and generating, for each bit position, a bit value correspondence signal having an asserted condition if the bits have different values, and a negated condition if the bits have the same value;

B. a complement circuit for generating complement bit value correspondence signals having values representative of the complements of respective bit value correspondence signals from the exclusive-OR circuit and C. a coincident circuit for generating the latch control signal having an asserted condition if all of the complement bit value correspondence signals are asserted, and otherwise generating the latch control signal to have a negated condition.

9. A data coupling arrangement as defined in claim 7 in which said latch circuit comprises:

A. a flip-flop circuit for receiving and latching a selected correspondence signal generating, in response, a latched selected correspondence signal; and B. a multiplexer connected to said bit-wise comparison circuit and said flip-flop circuit, the multiplexer coupling as the selected correspondence signal to the flip-flop circuit:
  (i) the signal from the bit-wise comparison circuit while the latched selected correspondence signal control signal is asserted; and
  (ii) the latched selected correspondence signal from the flip-flop circuit while the latched selected correspondence signal is negated.

10. A data coupling arrangement as defined in claim 9 in which:
A. said multiplexer is further connected to couple an initialization signal for storage in the flip-flop circuit, and B. said arrangement further includes a multiplexer control circuit connected to said flip-flop circuit and said multiplexer, the multiplexer control circuit receiving the latched selected correspondence signal from the flip-flop circuit and an enable control signal and generating in response a multiplexer control signal for controlling the multiplexer, the multiplexer control signal enabling the multiplexer to couple:
  (i) the signal from the bit-wise comparison circuit while the latched selected correspondence signal control signal and enable signal are asserted;
  (ii) the latched selected correspondence signal from the flip-flop circuit while the latched selected correspondence signal is negated and the enable signal is asserted; and
  (iii) the initialization signal while the enable signal is negated.

* * * * *